Patented July 11, 1933

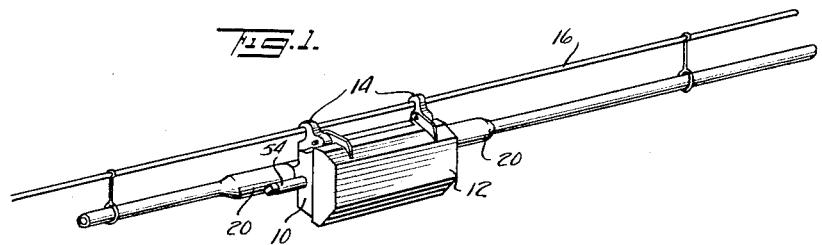
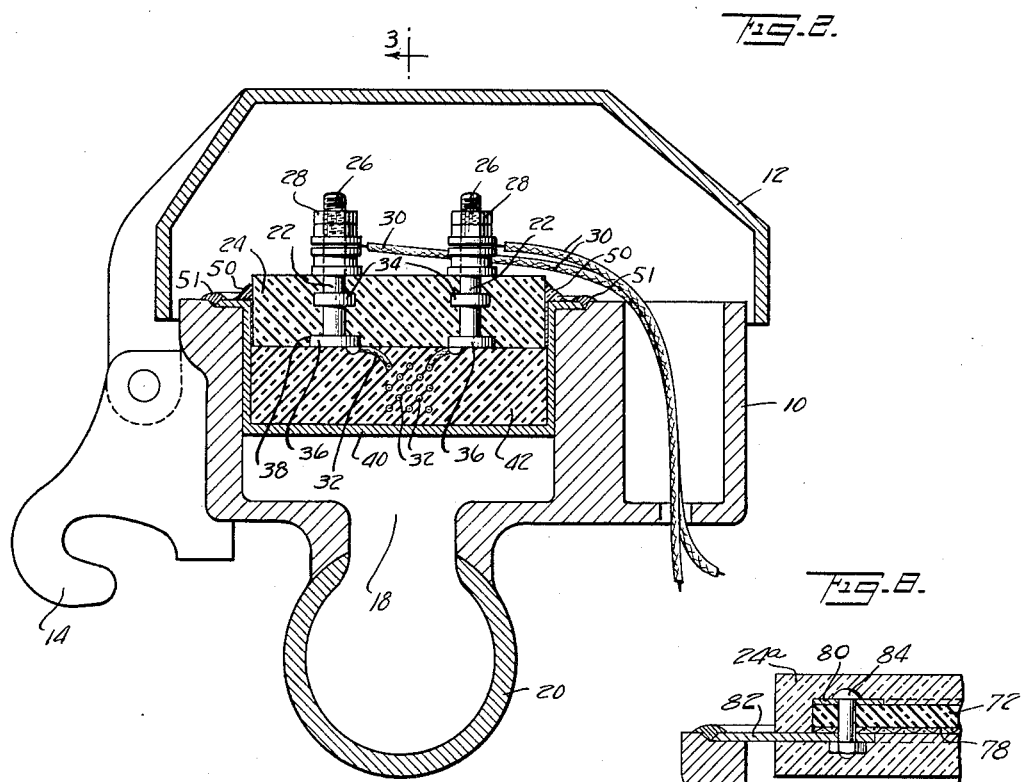
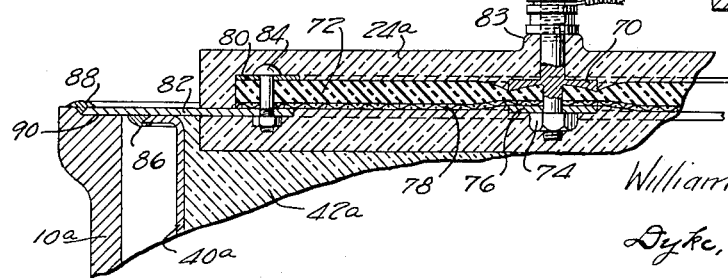

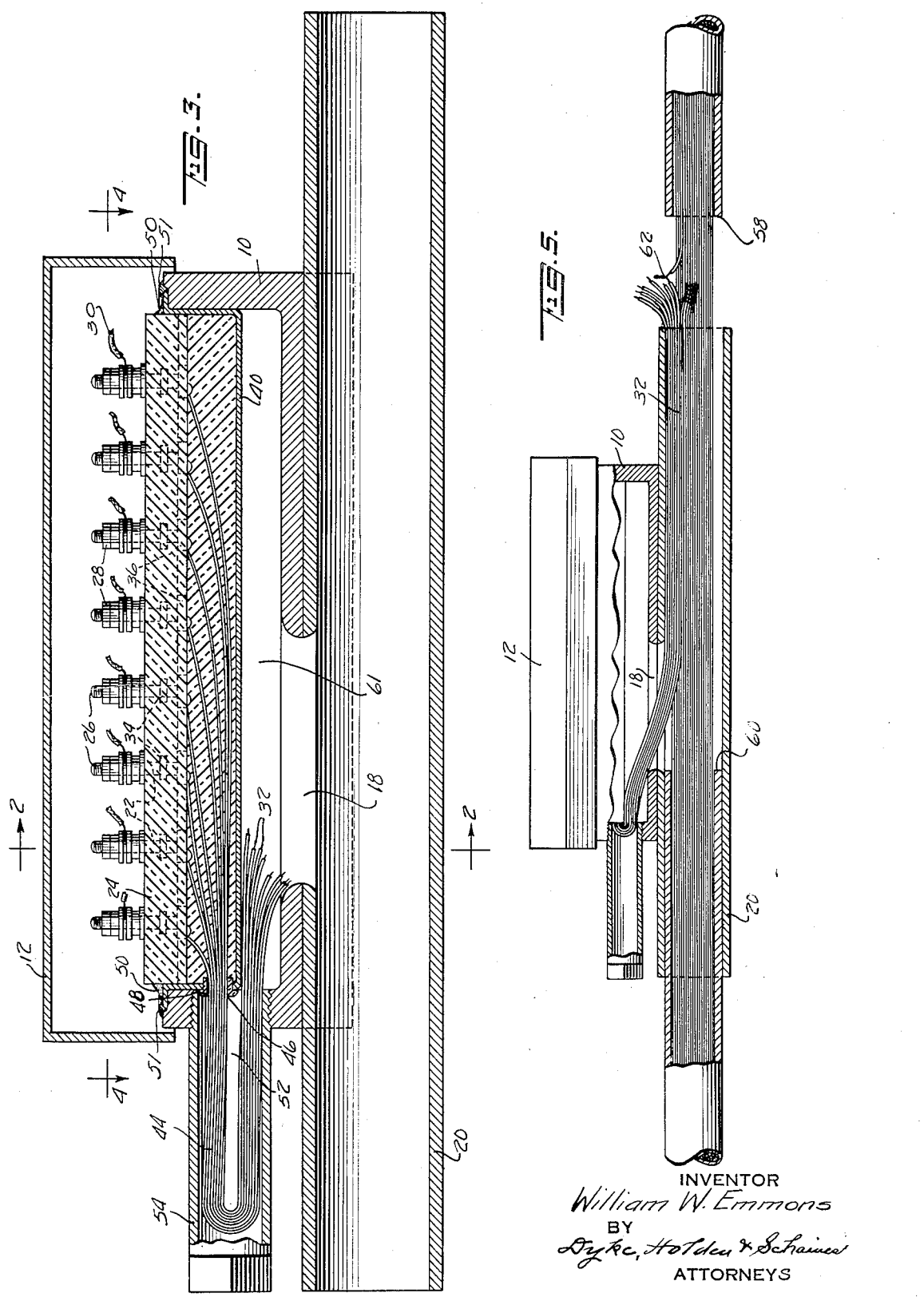

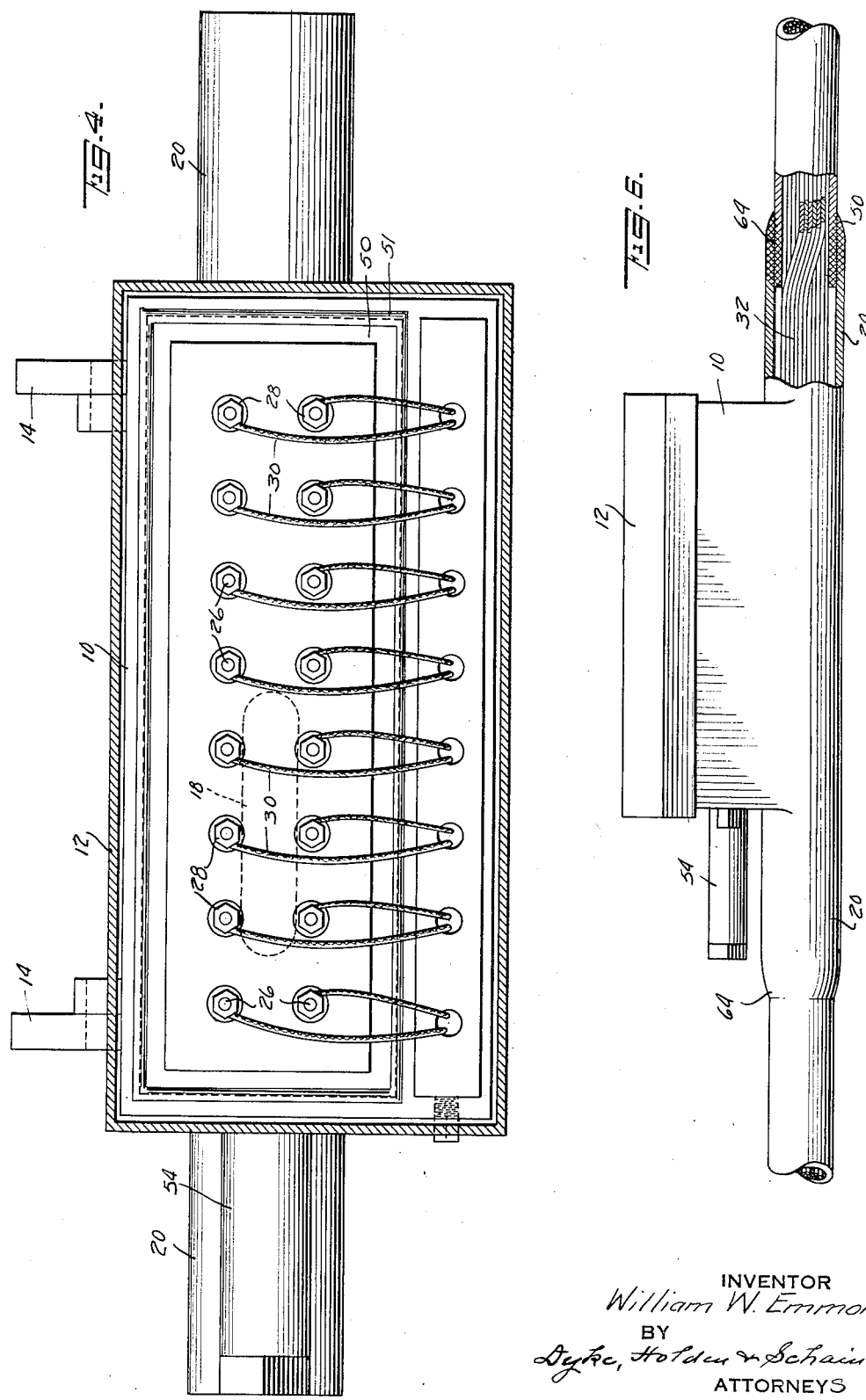

1,917,242

UNITED STATES PATENT OFFICE

WILLIAM W. EMMONS, OF NEWARK, NEW JERSEY

SLEEVE TERMINAL BOX FOR ELECTRIC CABLES

Application filed December 5, 1929. Serial No. 411,795.

The principal object of the present invention is the provison of a sleeve terminal box in which the lead out wires and their connections are permanently and hermetically sealed, and which is adapted for quantity manufacture and for installation with a material reduction in field work as compared with the device of my prior Patent No. 1,680,940, granted August 14, 1928.

With these and related objects in view, the invention will be best understood from a description of the preferred embodiment thereof which is illustrated in the accompanying drawings, in which:—

Fig. 1 is a perspective showing the complete box in its relation to a cable or pipe;

Fig. 2 is a transverse section on line 2—2 of Fig. 3;

Fig. 3 is a longitudinal section on line 3—3 of Fig. 2;

Fig. 4 is a horizontal section on line 4—4, of Fig. 3;

Fig. 5 is a diagrammatical longitudinal sectional view showing how the lead out wires are spliced into the line wires;

Fig. 6 is a view generally similar to Fig. 5, with the lead pipe closed by a wiped joint after splicing the wires;

Fig. 7 is a fragmentary transverse sectional view of a modified form; and

Fig. 8 is a similar detail showing the modification of Fig. 7 but with the tray and compound omitted.

In the form shown, the casing 10 is provided with hinged cover 12 and suspended by hooks 14 from the wire rope 16. It has a hole 18 in its base and communicating with the bore of a conduit section or sleeve 20 through a hole in the wall thereof, the section 20 being secured to casing 10 as by means of a wiped joint. If the terminal box assembly is put on the line conduit of lead pipe when the latter is erected, the section 20 can be slipped over same at erection. If not attached at erection the section 20 can be split, and its edges brought together and wiped with solder, after the split section is put in place around the lead pipe conduit.

The terminals 22 are molded in or otherwise received in an insulating plate or like member 24, and have exposed ends 26 arranged as with nuts 28 for screw connection of lead out wires 30 on the outer side of plate 24, and have the splicing wires 32 connected to their opposite ends on the inner side of the plate, as by soldering. The stems of terminal members 22 may be locally enlarged as at 34 for anchorage within the insulating member 24 if the latter is molded about the former, or if the screw terminals 22 are pushed through holes in an insulating member 24 that is premolded or otherwise formed in advance, the heads 36 thereof can have flat sides and be held from turning by being received in suitably formed recesses or grooves 38 provided therefor in the inner face of member 24.

The partial assembly consisting of insulating member 24, terminals 22 and splice wires 32 is permanently secured in a tray 40 made of metal, preferably lead, and sealed therein with molten plastic composition 42, the tray having substantially the same outline in plan as insulating member 24 so as to readily receive the latter to close the open side of the tray and the pig tail 44 of splicing wires 32 protrudes out of the body of composition 42 through a hole 46 about which the material of tray 40 is preferably reinforced by a ferrule 48, the pig tail 44 serving to sufficiently prevent any material outflow of molten composition 42 when the parts are being sealed as described. Some of the composition 42 may be expelled about member 24 in inserting the latter within the tray and when the excess is wiped off the remainder will provide an encircling seal as indicated at 50. The receptacle or tray 40 is preferably comparatively deep and preferably comprises a flat bottom wall and fairly high side walls adapted to enclose a substantially deep body of plastic composition 42 and still leave room for receiving the insulating block or plate 24.

The partial assembly just described and also the soldering at 51 of the tray 40 into the casing 10 are completed at the time of manufacture of the apparatus and the pigtail 44 of splicing wires is enclosed in such a manner as to give ready access thereto in field work without requiring special apparatus for making same tight after the splicing wires 32 are exposed for splicing. For this purpose, the pigtail 44 preferably extends through a screw threaded opening 52 provided in casing 10 opposite the hole 46 in tray 40 and is received and enclosed in a tubular taper-threaded plug 54 which makes a tight joint as when it is screwed up after application of paint or the like to its threaded part, the tubular plug 54 being closed at its outer end.

In the field, after the lead pipe conduit is received in sleeve 20, all that is necessary is to unscrew the plug 54 thereby exposing splicing wires 32, cut a piece out of the conduit lead pipe as between the points 58—60, Fig. 5, fish the pigtail 44 or any desired lesser part of splice wires 32 through the hole 18, sufficient space being provided within the chamber in casing 10 under tray 40 for this purpose as shown at 61, make the splice as indicated at 62, Fig. 5, and move the terminal box including conduit section 20 longitudinally so as to cover the cut-away part of the lead pipe at each end and make the customary wiped joints 64, 64 at each end of conduit section 20 to the lead pipe conduit.

After making connections as described, the hermetic seal is completed by screwing plug 54 securely in place with the pigtail 44 enclosed therein.

The modified form shown in Fig. 7 is especially well adapted for use where certainty of having the sealing hermetically tight is important, as in the case of telephone cables in which superatmospheric pressure is maintained. In this form the terminal screws 26$^a$ are formed with shouldered or flanged parts 70 and are inserted through small openings in a sheet 72 of resilient compressible material such as rubber, into which the terminal screws 26$^a$ are clamped in such a way as to compress the rubber, as by being bolted with nuts 74 and interposed washers 76. A second sheet 78 of canvas or the like may be placed on that side of the rubber sheet 72 that is engaged by the nuts and washers, and will serve to prevent the rubber being twisted up or pinched out from between the clamping surfaces. The under side of the shouldered portion 70 of the terminal sleeves 26$^a$ may be made concave or cupped as at 79 to further insure that the rubber will be held firmly between the clamping surfaces.

The sheet as 72, 78, with the terminals clamped therein as described, is clamped at the edges between the annular members 80, 82 of sheet metal, as by means of screws 84, the sheet metal ring 82 being extended outwardly so as to provide a projecting metallic flange for connection to the tray 40$^a$ by soldering on its under side at 86 and also to the casing 10$^a$ by being soldered at 88 into the recess 90 of casing 10$^a$ provided to receive member 82.

The plastic molded insulating plate 24$^a$ of bakelite or the like, is pressed and molded and hardened under high pressure to include the sheets as 72, 78 containing the terminal screws 26$^a$ with the sheet metal flange member 82 protruding from the edges of the plate 24$^a$, ready to have the tray 40$^a$ soldered thereto at 86 as already described. With the sealing compound 42$^a$ in the tray 40$^a$ the sealing of the terminals is highly efficient, passage of air being prevented by the compound 42 and by the compressed rubber embedded in plate 24$^a$ sealing the joint between the metallic terminals 26$^a$ and the molded insulating material 24 and making it permanently airtight, notwithstanding expansion and contraction due to thermal changes which would otherwise interfere with getting a thoroughly tight joint at this point. Also, plate 24$^a$ and the terminals projecting therefrom are securely held in place in the casing 10$^a$ by means of the projecting metallic ring flange 82. The pressing of the molded insulating material is readily carried out as the assemblies comprising the rubber sheets with terminals and gasketing rings in place can be preformed and bodily inserted in the mold. The side of the member 24$^a$ that is exposed to the air may be formed with studs or nipples 83 molded to surround each of the terminal screws in order to increase the intervening surface area and minimize short circuiting due to deposited dust, moisture, etc.

If desired, the arrangement of Fig. 7 can be modified by omission of tray 40$^a$ and sealing compound 42$^a$ as indicated in Fig. 8, and entire reliance for hermetic sealing placed upon the molded insulated plate 24$^a$ and the sealing sheet of rubber or equivalent elastic material 72. In such case the height of chamber 61 can be materially reduced and the structure greatly simplified.

It will be seen that the invention provides a device which is highly practical, extremely simple, eliminates all leakage, avoids substantially all possibility of deterioration in service, and is adapted for the maximum of fabrication work at the time of manufacture, and use thereof involves the minimum work and loss of time in the field.

Modifications may be made within the scope of my claims without departing from my invention.

I claim:

1. In a sleeve terminal box a chambered casing, a tray of substantial depth and comprising bottom and side walls fitted within the casing and secured therein about the edges of the tray and chamber, and lead-out wires and connections permanently sealed in the recess provided in said tray.

2. In a sleeve terminal box, a chambered casing and a substantially deep tray containwithin its recessed interior permanently sealed lead-out wires and terminals, said tray extending but part way down in the casing.

3. In a sleeve terminal box, a chambered casing, a substantially deep tray extending part way down in the chamber in the casing, lead wires and terminals permanently sealed in the recess within the tray, the lead wires extending through an opening in the tray into that part of the chamber that is beyond the tray.

4. In a sleeve terminal box, a chambered casing, a second chambered casing adapted to be received in and to fill but part of the chamber in the first named casing, and lead wires and terminals permanently sealed in the chambered interior of said second casing.

5. In a sleeve terminal box, a chambered casing, a second casing therein and extending only part way to the bottom of the chamber, terminals and wires sealed in the chambered interior of the second casing with the wires projecting into the further portion of the first casing, an opening provided in the chamber wall for protrusion of the wires, and a hollow plug screwed into said opening and adapted to house the protruding wire portions.

6. In a sleeve terminal box, a chambered casing, a metal tray secured to the casing about its edges and the chamber edges, an insulating plate in the tray, terminals in the insulating plate, wires attached to the inner ends of the terminals and extending in a pigtail into the chamber out of an opening provided in the tray wall, a filling of cementitious plastic filling the tray and sealing the terminals, insulating plate and wires thereing, a sleeve communicating with the chamber beneath the tray, and means for giving access to the pigtail and wires in the chamber beneath the tray.

7. Device as in claim 6 having a hollow screw plug into which the pigtail of wires can be received when folded into substantial U-shape.

8. In a sleeve terminal box, a chambered casing, a sleeve having its bore in communication with the chamber through a hole formed therebetween for admission of wires from a cable, terminals supported by the casing and splice wires connected to the inner ends of the terminals and extending out through a lateral wall of the casing, and a removable and replaceable covering for the protruding portion of the splice wires.

9. The combination of terminal screws provided with shouldered parts, compressible resilient material engaging the shoulder, fabric material reenforcing the resilient material, means for clamping the fabric material and resilient material in compression against said shoulders, metal clamping rings between which the resilient material is clamped about its edges, and molded insulating material enclosing the aforementioned structure except for marginal projection of one of the metallic rings.

10. In a terminal box, a casing having terminal supporting means in one part thereof for the connection of lead-out wires and a free space in the other part thereof having an outlet, said casing having an opening through the wall thereof at the margin of said terminal supporting means and in communication with said space for the passing of wires in loop formation from said terminal supporting means into said space, and means for closing said opening and covering the looped portion of the lead-out wires.

11. In a terminal box, a casing having a receptacle in one part thereof receiving sealing material and lead-out wires embedded in said sealing material, said casing having an opening through a wall thereof in communication with said receptacle at the margin thereof and with the space in said casing at the base of the receptacle, said opening providing clearance for a looped portion of the lead-out wires for passing the same into said space, and means for closing said opening and protecting the looped portion of the lead-out wires.

12. In a terminal box, a casing, terminal and lead-out wires supporting means substantially filling the top portion of said casing, and leaving a space at the bottom of the casing having an outlet, said casing having an opening therethrough at the margin of the supporting means and in communication with said space for passing the lead-out wires from said supporting means around the bottom edge thereof into said space, and a plug closing said opening and having a chamber therein for the looped portion of the lead-out wires.

13. In a terminal box, a casing, a tray closely fitting said casing at the top thereof, lead-out wires and connections permanently sealed in said tray, and an extension chamber having communication with said tray at the margin thereof and with the interior of the casing below the tray and looped wires extending from the connections through an opening in the tray and redirected into said space.

14. In a terminal box, a casing having a receptacle at the top thereof, lead-out wires and terminals permanently sealed in said receptacle, an opening in the casing communicating with the receptacle and with the casing below the receptacle, and a removable plug for closing said opening, said plug having a hollow interior for receiving a looped portion of the lead-out wires extending from said receptacle into said lower space.

15. In a terminal box, a casing, a tray secured within and substantially filling the top of the casing, a sealing material disposed within the tray, an insulating plate disposed within the tray upon the sealing material, terminals on said plate and lead-out wires therefrom embedded in said sealing material, and means for conducting the lead-out wires from the tray into the free space within the casing.

16. In a terminal box, a casing, a sleeve communicating with the chamber therein, terminals and lead-out wires supported within the upper part of the casing, said casing having an opening through the lateral wall thereof providing clearance for a looped portion of the lead-out wires leading into said chamber, and a removable cover for the looped portion of the lead-out wires and for closing said opening.

In testimony whereof, I have signed my name hereto.

WILLIAM W. EMMONS.